US011842354B1

(12) United States Patent
Chamberlain et al.

(10) Patent No.: US 11,842,354 B1
(45) Date of Patent: Dec. 12, 2023

(54) RISK DETECTION OF FALSE CUSTOMER INFORMATION

(71) Applicant: Wells Fargo Bank, N.A., San Francisco, CA (US)

(72) Inventors: Kelley Chamberlain, Huntersville, NC (US); David J. Dietrich, Charlotte, NC (US); Valeria J. Gray-Lindsey, Charlotte, NC (US); Michael Knorr, Fairfield, CT (US); Robert L Kosicki, Huntersville, NC (US); Duane F. Lindquist, Glenview, IL (US); Michael Mangieri, West Islip, NY (US); Maria V. Marmolejos, Santo Domingo (DO); Jacqueline A. Monteferrario, Franklin Lakes, NJ (US); Yonesy F Nunez, Allentown, PA (US); Leonard J. Valentino, Stamford, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 126 days.

(21) Appl. No.: 17/472,391

(22) Filed: Sep. 10, 2021

Related U.S. Application Data (63) Continuation of application No. 16/010,292, filed on Jun. 15, 2018, now Pat. No. 11,132,697.

(51) Int. Cl.
　　*G06Q 30/00*　　(2023.01)
　　*G06Q 30/018*　　(2023.01)
　　*G06F 16/951*　　(2019.01)

(52) U.S. Cl.
　　CPC ....... *G06Q 30/0185* (2013.01); *G06F 16/951* (2019.01)

(58) Field of Classification Search
None
See application file for complete search history.

(56) References Cited

U.S. PATENT DOCUMENTS

| 7,908,645 B2 | 3/2011 | Varghese et al. |
| 8,739,278 B2 | 5/2014 | Varghese |

(Continued)

OTHER PUBLICATIONS

FraudMAP(R) emerges as standard for anomaly detection and transaction monitoring: Guardian analytics finishes 2010 with record growth in customers and revenue. (Feb. 8, 2011). PR Newswire Retrieved from https://dialog.proquest.com/professional/docview/849627210?accountid=131444 on Jul. 24, 2023 (Year: 2011).*

(Continued)

*Primary Examiner* — Kito R Robinson
(74) *Attorney, Agent, or Firm* — Foley & Lardner LLP (57) ABSTRACT

A computing system includes one or more processors and one or more computer-readable storage media communicatively connected to the one or more processors. The one or more computer-readable storage media have instructions stored thereon that, when executed by the one or more processors, cause the one or more processors to receive a request from a user device to process an electronic transaction, identify an anomaly, transmit data corresponding to the anomaly to an interactive dashboard, receive a first response from the interactive dashboard, transmit an indication of one or more rule violations and instructions, receive a second response from the interactive dashboard, update the profile of a user.

16 Claims, 4 Drawing Sheets

(56) References Cited

U.S. PATENT DOCUMENTS

| | | | |
|---|---|---|---|
| 8,990,948 | B2 | 3/2015 | Kumar et al. |
| 9,536,065 | B2 | 1/2017 | Bouse et al. |
| 9,646,301 | B2 | 5/2017 | Dimuro |
| 9,672,355 | B2 | 6/2017 | Titonis et al. |
| 9,699,205 | B2 | 7/2017 | Muddu et al. |
| 9,818,116 | B2 | 11/2017 | Caldera |
| 9,917,846 | B1 | 3/2018 | Magi Shaashua et al. |
| 10,242,540 | B2 * | 3/2019 | Chen .................. G06Q 20/4016 |
| 10,657,535 | B1 * | 5/2020 | Yaqub ................ G06Q 20/4014 |
| 10,878,428 | B1 * | 12/2020 | Comeaux ........... G06Q 30/0185 |
| 10,885,527 | B1 * | 1/2021 | Kalaboukis ........ G06Q 20/4015 |
| 2003/0187716 | A1 * | 10/2003 | Lee ........................ G06Q 30/02 |
| | | | 705/7.29 |
| 2006/0064374 | A1 * | 3/2006 | Helsper .................. G06Q 30/02 |
| | | | 705/39 |
| 2009/0012898 | A1 | 1/2009 | Sharma et al. |
| 2010/0250410 | A1 | 9/2010 | Song et al. |
| 2012/0130853 | A1 * | 5/2012 | Petri .................. G06Q 30/0609 |
| | | | 705/26.35 |
| 2012/0158586 | A1 * | 6/2012 | Ganti .................... G06Q 20/405 |
| | | | 705/44 |
| 2013/0185191 | A1 * | 7/2013 | Ganor .................... G06Q 40/02 |
| | | | 705/39 |
| 2014/0214676 | A1 | 7/2014 | Bukai |
| 2014/0325657 | A1 | 10/2014 | Bailey |
| 2015/0039513 | A1 | 2/2015 | Adjaoute |
| 2016/0044054 | A1 | 2/2016 | Stiansen et al. |
| 2016/0321643 | A1 | 11/2016 | Beck et al. |
| 2016/0343100 | A1 | 11/2016 | Davenport et al. |
| 2017/0132635 | A1 | 5/2017 | Caldera |
| 2018/0268408 | A1 | 9/2018 | Botros et al. |
| 2018/0343314 | A1 * | 11/2018 | Lal ........................ G06F 3/0608 |

OTHER PUBLICATIONS

Advisory Action on U.S. Appl. No. 16/010,292 dated Oct. 9, 2020.

Baber et al., Final Evaluation Report of SPEEDD Dashboards for credit Card Fraud management, Dec. 2016. 36 pages.

Final Office Action on U.S. Appl. No. 16/010,292 dated Jul. 22, 2020.

Non-Final Office Action on U.S. Appl. No. 16/010,292 dated Jan. 21, 2021.

Non-Final Office Action on U.S. Appl. No. 16/010,292 dated Feb. 20, 2020.

Notice of Allowance on U.S. Appl. No. 16/010,292 dated May 26, 2021.

* cited by examiner

RISK DETECTION OF FALSE CUSTOMER INFORMATION

CROSS-REFERENCE TO RELATED APPLICATIONS AND CLAIM OF PRIORITY

This application is a continuation of U.S. application Ser. No. 16/010,292, entitled "RISK DETECTION OF FALSE CUSTOMER INFORMATION," filed Jun. 15, 2018, of which is incorporated herein by reference in its entirety and for all purposes.

BACKGROUND

Traditionally, a provider institution relies on information provided by a customer of the provider institution when creating an electronic transfer account for the customer to engage in electronic transactions. However, the customer may make a mistake when providing the information, or may not be entirely truthful with the provider institution especially when the customer is in a line of business that is considered to be unlawful or illegal. In this case, a digital profile associated with the customer may store false information in a database associated with the provider institution. Further, a customer who enterprises in unlawful or illegal activities typically engage in risky transactions that may be unlawful. Relying on false information to process risky or unlawful electronic transactions can expose the provider institution to regulatory fines and other risks. Accordingly, a system for identifying false information in a customer's profile when processing electronic transactions is desired.

SUMMARY

One arrangement of the present disclosure is a computing system of a provider institution. The system includes one or more processors and one or more computer-readable storage media communicatively connected to the one or more processors. The one or more computer-readable storage media have instructions stored thereon that, when executed by the one or more processors, cause the one or more processors to: receive a request from a user device to process an electronic transaction; identify an anomaly associated with the electronic transaction; transmit a notification to the user device to cause display of data corresponding to the anomaly on the user device; receive a response from the user device indicating that one or more risks associated with the anomaly are acceptable; and update a profile of the user stored in a data store to change a classification of the user from a first classification to a second classification based on the response.

Another arrangement of the present disclosure is a method. The method includes: receiving, by one or more processors of a computing system of a provider institution, a request from a user device to process an electronic transaction; identifying, by the one or more processors, an anomaly associated with the electronic transaction; transmitting, by the one or more processors, a notification to the user device to cause display of data corresponding to the anomaly on the user device; receiving, by the one or more processors, a response from the user device indicating that one or more risks associated with the anomaly are acceptable; and updating, by the one or more processors, a profile of the user stored in a data store to change a classification of the user from a first classification to a second classification based on the response.

Another arrangement of the present disclosure is a non-transitory computer-readable medium. The non-transitory computer-readable medium has processor-readable instructions stored thereon such that, when executed by a processor, cause the processor to: receive a request from a user device to process an electronic transaction for a payment from the user of the user device to a beneficiary; identify an anomaly associated with the electronic transaction based on information corresponding to a type of business of the beneficiary being inconsistent with information corresponding to a type of business of the user; transmit a notification to the user device to cause display of detailed information about the electronic transaction and one or more reasons why the anomaly was identified on an interactive dashboard on the user device; receive a response from the user device indicating that one or more risks associated with the anomaly are acceptable; and update a business or industry type in a profile of the user stored in a data store to change the business or industry type of the user from a first classification to a second classification based on the response, wherein the business or industry type of the user corresponds to profile information that was originally provided by the user.

BRIEF DESCRIPTION OF THE DRAWINGS

The above and other aspects and features of the present disclosure will become more apparent to those skilled in the art from the following detailed description of the example arrangements with reference to the accompanying drawings, in which.

DETAILED DESCRIPTION

One or more example arrangements described herein relate to systems, apparatuses, and methods for implementing Artificial Intelligence (AI) to identify risks associated with an electronic transaction for payment from a customer (an originator, an authorized account holder, a user, or payor) of the payment to a beneficiary (or payee) of the payment. The AI system detects anomalies from the electronic transaction, and automatically determines a risk that some information associated with the customer is false. As used in this specification, the terms "automatic" or "automatically" are defined as pertaining to an electronically carried out action that does not require outside (either human or machine) intervention to be scheduled, triggered, executed, and/or completed.

In general, the arrangements of the AI system described herein automate identifying false information in a profile for the customer from the customer's activities that has not been previously automated. Traditionally, provider institutions must rely on the information provided by the customer when setting up an account or profile for the customer. However, for example, the customer could mistakenly provide false information. Further, when the customer is a bad actor (e.g., involved in unlawful or illegal activity), the customer may intentionally provide false information in order to establish the account with the provider institution. For example, the customer may falsely claim that it is a certain type of business when it is actually an unlawful or illegal enterprise. The AI system described herein can learn from the customer's activities to determine if the customer has provided false information (mistakenly or intentionally) and then automatically update or modify the customer's profile. In some arrangements, the AI system can take additional actions depending on the severity of the false information, such as, for example, stopping payment, placing a hold on the customer's account, notifying authorities, flagging the account for addition review, and/or the like. The systems and methods disclosed herein can be adapted to monitor the customer's account information, the customer's historical transaction data, and/or $3^{rd}$ party data relating to the customer or the customer's activities.

In an example arrangement, the AI system includes a particular and unique set of rules, which are set up to account for and learn from the customer's activities and to produce an accurate prediction of the customer's information (e.g., business type) that would have required human intervention. Additionally, another particular and unique set of rules define automated transaction processing, notifications, risk score generation, electronic communications, and the like, which traditionally would have required an evaluation by a human being.

The arrangements of the AI system described herein improve computer-related technology by performing certain steps that cannot be done by conventional provider institution systems or human actors. For example, the AI system is configured to proactively determine false information in a customer's profile using context information and behavioral information. In some arrangements, to achieve benefits over conventional systems having databases, table, and field definitions that are static, the databases described herein may be data-type agnostic and configured to store different information for different users, transaction types, and the like. Furthermore, to achieve benefits over conventional databases and to solve a technical problem of improving dimensional scalability (such that different aspects of transactions may be analyzed for different users on the same data storage infrastructure as an autonomous bill pay bot learns the relevant aspects through pattern mining and machine learning), and faster identification of false information by reducing computer processing times for analyzing transactions of customers and available information from multiple sources, the data stored in multidimensional form may be aggregated and/or stored using improved methods. For example, the risk score of the customer may be dynamically calculated after being stored when the data is retrieved for analysis and/or transaction processing.

In some arrangements, if the AI system identifies an anomaly associated with the electronic transaction, the AI system sends a notification or otherwise notifies the customer of the anomaly. For example, the AI system may visually display (e.g., via an electronic user interface such as an interactive dashboard) or otherwise indicate on a user device associated with the customer, one or more attributes that are determined to be anomalous. In this case, the customer may respond to the notification by interacting with the user device to provide additional information or to indicate whether the anomaly is acceptable or unacceptable. Accordingly, arrangements described herein solve the technical problem of determining the appearance and functionality of an electronic user interface for providing information corresponding to a detected anomalies for review by the customer. Further, arrangements described herein solve the internet-centric problem of automating data collection from the customer and providing these services in a convenient manner (e.g., via a mobile device of a customer using push notifications, messages, or other alerts).

Figure 1:
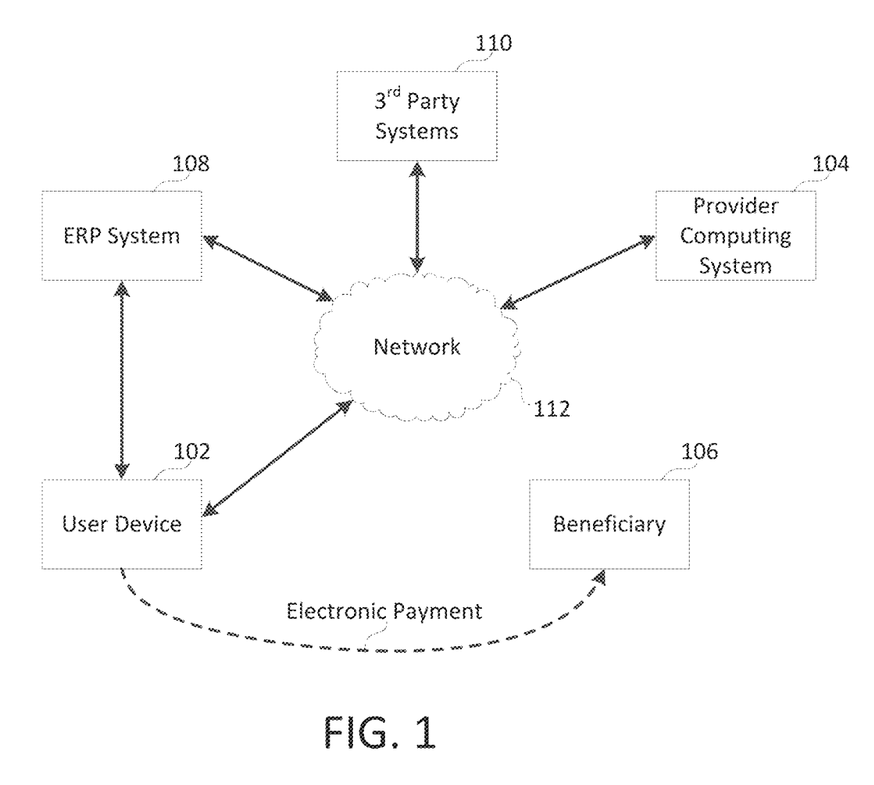
FIG. 1 is a diagram of an example of a system for providing automated risk analysis services, according to some arrangements.

FIG. 1 is a diagram of an example of a system 100 for providing automated risk analysis services according to some arrangements. Referring to FIG. 1, a user (customer, authorized account holder, or originator) of a user device 102 is a customer of a provider institution associated with a provider computing system 104. The user of the user device 102 may be any suitable entity (e.g., an individual, a company, or the like). In some arrangements, the provider institution may be a financial institution. Accordingly, the user may have an account (e.g., checking account, savings account, credit account, mortgage account, and/or the like) established with the provider institution, and the provider institution may store information corresponding to the user. For example, the provider institution may store a profile corresponding to the user in a data store (e.g., account database 240 in FIG. 2 or the like) accessible by the provider computing system 104. In some arrangements, the profile corresponding to the user may include information about the user, such as, for example, name, address, telephone number, business type, industry type, business hours, working days or non-working days, number of employees, net worth, assets, liabilities, and/or the like.

In some arrangements, the provider institution can collect and store transactional information in the course of dealing (e.g., processing transactions, offering products/services, and the like) with the user. For example, the user may operate the electronic device 102 to initiate an electronic transaction with the provider computing system 104 to make a payment to a beneficiary 106. The beneficiary 106 may be any suitable entity (e.g., an individual, a company, or the like). For example, the beneficiary 106 may be a vendor or a supplier for the user. The electronic transaction may be processed by the provider computing system 104, and transactional information corresponding to the electronic transaction may be collected and stored. In some arrangements, the transactional information may include, for example, transaction type, location where the transaction was initiated, amount, date, time, beneficiary information, beneficiary location or address, beneficiary industry or business, and/or the like.

In some arrangements, the user device 102 may be connected to a resource management system (e.g., an enterprise resource planning (ERP) system, or the like) 108 to manage day-to-day business activities, such as accounting and procurement. The user may access the ERP system 108 (e.g., via the user device 102 or any suitable device) to input, delete, or edit trading partner information (e.g., vendors, suppliers, or the like). In this case, the provider computing system 104 can collect (e.g., via an application programming interface API or the like) or otherwise receive updates to the trading partner information from the ERP system 108, and can use the trading partner information to identify potential beneficiaries of payments. For example, when a new trading partner is added to the ERP system 108, the provider computing system 104 can identify the name, location or address, industry or business, and/or the like from the trading partner information for the new trading partner or potential beneficiary, and can use the trading partner information to identify that the beneficiary information is correct when payments are made to the new trading partner. In another example, when a trading partner is removed from the ERP system or otherwise indicated as being disabled, the provider computing system 104 can use this information to determine that subsequent payments to the disabled trading partner may be an anomaly.

In some arrangements, the provider computing system 104 may be connected to one or more $3^{rd}$ party systems 110 to collect (e.g., via API) or otherwise receive $3^{rd}$ party data that may be used to identify anomalies in an electronic transaction. For example, in some arrangements, the provider computing system 104 may collect or otherwise receive public records data (e.g., entity, corporation, or other business data) from a public records service (e.g., secretary of state), news data from a news service, documents and other document-related data from a document service, media (e.g., video, images, audio, social media, etc.) from a media service, authority data from an authority alert service, and/or the like. The provider computing system 104 may use the $3^{rd}$ party data to identify anomalies or potentially fraudulent transactions. For example, if a user or beneficiary has been recently dissolved, then any subsequent payments made by the user or made to the beneficiary may be identified as being an anomaly. Similarly, if a user or beneficiary has been identified by news media outlets as being a fraudster or a bad actor, then any payments made by the user or made to the beneficiary may be identified as being potentially fraudulent. As a further example, if a particular transaction includes one or more characteristics of a recent fraud trend as identified through media outlets or authority alerts, then the particular transaction may be identified as being a potentially fraudulent transaction.

Still referring to FIG. 1, the user device 102, ERP system 108, and $3^{rd}$ party systems 110 are connected to the provider computing system 104 via a communication network 112. The communication network 112 is any suitable Local Area Network (LAN) or Wide Area Network (WAN). For example, the communication network 112 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combinations thereof, and/or the like. The communication network 112 is structured to permit the exchange of data, values, instructions, messages, and the like among the provider computing system 104 and the user device 102, ERP system 108, and $3^{rd}$ party systems 110.

Figure 2A:
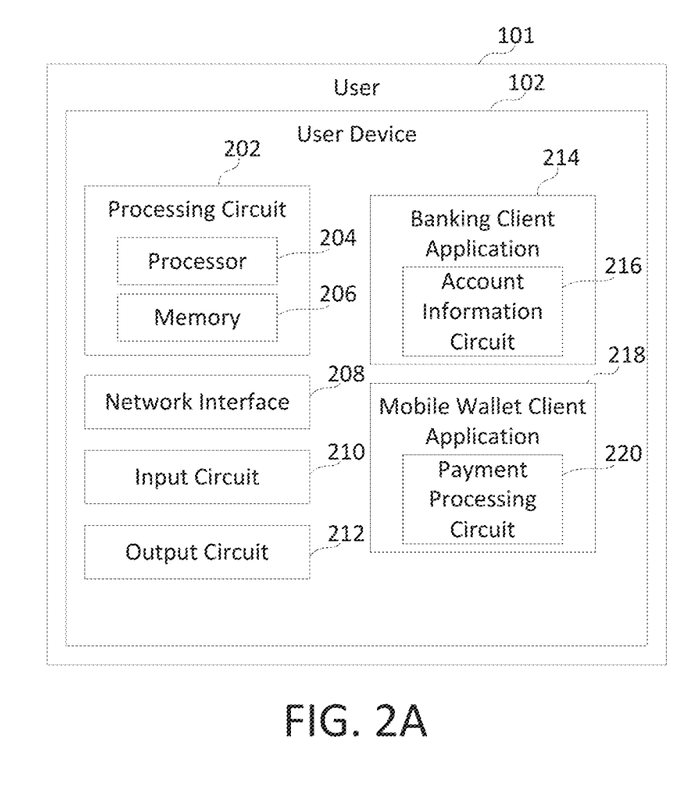
FIG. 2A is a diagram of an example of the user device of the system set forth in FIG. 1, according to some arrangements.
Figure 2B:
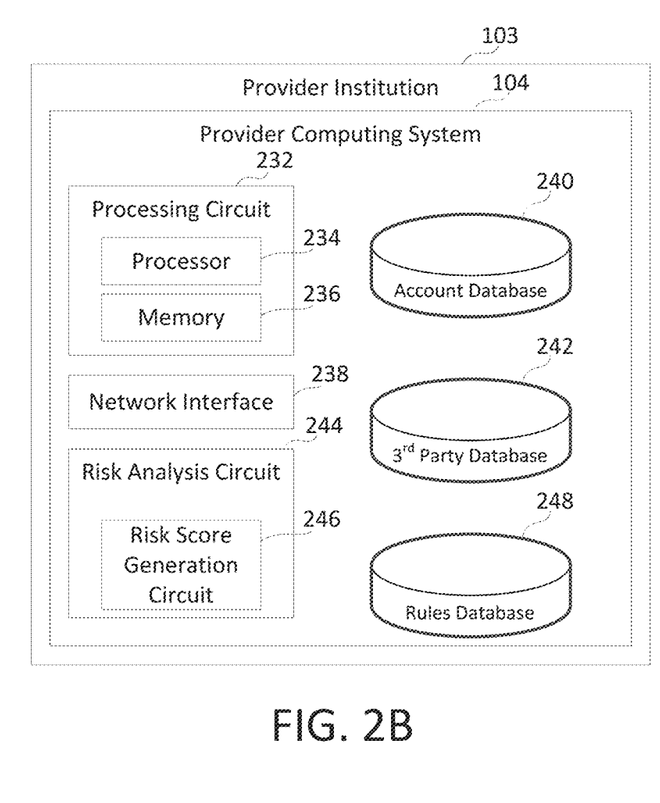
FIG. 2B is a diagram of an example of the provider computing system of the system set forth in FIG. 1, according to some arrangements.

FIG. 2A is a diagram of an example of the user device 102 of the system 100 set forth in FIG. 1, according to some arrangements. FIG. 2B is a diagram of an example of the provider computing system 104 of the system 100 set forth in FIG. 1, according to some arrangements. Referring to FIGS. 1 through 2B, a user (customer, authorized account holder, or originator) 101 operates or otherwise interacts with the user device 102. The user 101 may be any suitable entity (e.g., an individual, a company, or the like). The user device 102 may be any suitable device (e.g., a personal computer, laptop, tablet, smart phone, mobile phone, smart watch, or the like).

In some arrangements, the user device 102 includes a processing circuit 202 having a processor 204 and memory 206. The processor 204 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 206 can be implemented with a Random Access Memory (RAM), Read-Only Memory (ROM), Non-volatile RAM (NVRAM), Flash Memory, hard disk storage, and other suitable electronic storage. The memory 206 stores data and/or computer code for facilitating the various processes described herein. The memory 206 stores instructions or programming logic that, when executed by the processor 204, controls the operations of the user device 102. Moreover, the memory 206 is or includes tangible, non-transient volatile memory or non-volatile memory. Accordingly, the memory 206 includes database components, object code components, script components, or any other type of information structure for supporting the various activities and information structures described herein.

The user device 102 is shown to include various circuits and logic for implementing the activities described herein. For example, the user device 102 includes one or more of the processing circuit 202, network interface 208, input circuit 210, output circuit 212, a banking client application 214, a mobile wallet client application 218, and/or the like. While various circuits, interfaces, and logic with particular functionality are shown, it should be understood that the user device 102 includes any number of circuits, interfaces, and logic for facilitating the functions described herein. For example, the activities of multiple circuits may be combined as a single circuit and implemented on a same processing circuit (e.g., the processing circuit 202), or additional circuits with additional functionality may be further included.

The network interface 208 is configured for and structured to establish a communication session via the communication network 112 with the provider computing system 104. The network interface 208 may include any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The input circuit 210 is configured to receive user input from the user 101. The output circuit 212 is configured to output information in the form of graphics, sound, tactile feedback (e.g., vibrations), and the like. In this regard, the input circuit 210 and the output circuit 212 are structured to exchange data, communications, instructions, and the like with an input/output component of the user device 102. Accordingly, in some arrangements, the input circuit 210 and the output circuit 212 can be combined into an input/output circuit that includes or is connected to an input/output device such as, but not limited to, a display device, touchscreen, keyboard, microphone, and/or the like. In some arrangements, the input/output circuit includes communication circuitry for facilitating the exchange of data, values, messages, and the like between the input/output device and the components of the user device 102. In some arrangements, the input circuit 210 and the output circuit 212 include machine-readable media for facilitating the exchange of information between the input/output device and the components of the user device 102. In still other arrangements, the input circuit 210 and the output circuit 212 may include any combination of hardware components (e.g., a touchscreen), communication circuitry, and machine-readable media.

One or more of the banking client application 214 and mobile wallet client application 218 may be server-based applications executable on the user device 102. In this regard, the user 101 may download the banking client application 214 and/or the mobile wallet client application prior to usage, or at least one of the banking client application 214 or the mobile wallet client application may be pre-installed (e.g., by a manufacturer, distributor, service provider, or the like) on the user device 102. In another arrangement, the banking client application 214 and/or mobile wallet client application 218 are coded into the memory 206 of the user device 110. In still another arrangement, the banking client application 214 and/or mobile wallet client application 218 are web-based interface applications. In this case, the user 101 logs onto or otherwise accesses the web-based interface. In this regard, at least one of the banking client application 214 and mobile wallet client application 218 is supported by a separate computing system comprising one or more servers, processors, network interface modules, etc., that transmit the applications for use to the user device 102. In an arrangement, one or more of the banking client application 214 and/or mobile wallet client application 218 include an API and/or a Software Development Kit (SDK) that facilitate integration of other applications. All such variations and combinations are intended to fall within the spirit and scope of the present disclosure.

The banking client application 214 is communicably coupled to the provider computing system 104 (e.g., the account database 240) via the communication network 112, and is structured to permit management of at least one account of the user 101 via the banking client application 214. In this regard, the banking client application 214 provides indicative displays (or dashboards) of account information such as, but not limited to, current account balances, pending transactions, profile information (e.g., contact information), rewards associated with the account, bill pay information and/or the like. In some examples, a bill pay option is provided by the banking client application 214, where the bill pay option allows the user 101 to pay bills in response to user input. Further, in some arrangements, the banking client application 214 is configured to process payments from the user 101 to a designated beneficiary. For example, a user may initiate via the banking client application 214 a transfer or payment (e.g., a wire transfer) from an account (e.g., checking or savings) associated with the user 101 to an account associated with the designated beneficiary. The account associated with the designated beneficiary may be established with the same provider institution 103 or a different provider institution.

Thus, via the banking client application 214, the user 101 may pay bills (e.g., credit card, mortgage, and the like), view balances, pay merchants or trading partners (e.g., suppliers and vendors), and otherwise manage accounts. Accordingly, the banking client application 214 includes an account information circuit 216. The account information circuit 216 is linked or otherwise connected to one or more accounts (as stored in the account database 240) associated with the user 101, and permit management of the associated accounts (e.g., transfer balances between accounts, view payment history, and the like) by communicating with the provider computing system 104. In some arrangements, the banking client application 214 is communicably connected to the mobile wallet client application 218. As such, in response to a mobile payment via the mobile wallet client application 218, the mobile wallet client application 218 causes the banking client application 214 to update the payment account (e.g., the account associated with the mobile payment). Accordingly, in some arrangements, the applications 214 and 218 may be communicably connected to each other to enable actions supported by each respective application.

The mobile wallet client application 218 is communicably connected to the provider computing system 103 (e.g., the account database 240) via the communication network 112 and is structured to facilitate purchases, payments, or transfers by the user 101 via the mobile wallet client application 218. Accordingly, the mobile wallet client application 218 is linked with or otherwise connected to one or more accounts (as stored in the account database 240) of the user 101. In operation, when at a point-of-sale terminal (POS terminal) or the like, the user 101 initiates the mobile wallet client application 218 and provides a passcode (e.g., biometrics such as a thumbprint, a Personal Identification Number (PIN), a password, or the like) to authenticate the user 101, and selects the desired source payment account (e.g., a checking account from the provider institution 103 that is linked to the mobile wallet client application 218). The aforementioned payment information is provided to the POS terminal or to the merchant (e.g., via NFC, via barcode presentment, or the like) via communication with the payment terminal (e.g., via near field communication), and the payment transaction is sent to the provider computing system (e.g., via network 112) to be processed.

Accordingly, the mobile wallet client application 218 is communicably connected via the network interface 208 over the communication network 112 to the provider computing system 104. As shown, the mobile wallet client application 218 includes a payment processing circuit 220 structured to facilitate payments by the user 101 via the mobile wallet client application 218. For example, the payment processing circuit 220 enables a quick-pay capability with a merchant, supplier, or vendor. In this regard, the payment processing circuit 220 includes or is communicably connected with a communication device (e.g., a near-field communication chip) that facilitates the exchange of information between the mobile wallet client application 218 and a POS terminal or the like.

Still referring to FIGS. 1 through 2B, in some arrangements, the provider institution 103 is a financial institution or the like having at least one associated provider computing system 104. In some arrangements, the provider institution 103 provides products and services such as, but not limited to, credit card accounts, mobile wallet, checking/saving accounts, retirement accounts, mortgage accounts, loan accounts, investment accounts, and/or the like to the user (or originator) 101 via the provider computing system 104.

In some arrangements, the provider computing system 104 includes a processing circuit 232 including a processor 234 and a memory device 236. The processor 234 can be implemented with a general-purpose processor, an ASIC, one or more FPGAs, a DSP, a group of processing components that are distributed over various geographic locations or housed in a single location or device, or other suitable electronic processing components. The memory 236 can be implemented with RAM, NVRAM, ROM, Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores instructions or programming logic that, when executed by the processor 234, controls the operations of the provider computing system 104. In some arrangements, the processor 234 and the memory 236 form various processing circuits in the provider computing system 104.

As shown in FIG. 2B, the provider computing system 104 includes a network interface 238. The network interface 238 is structured for sending and receiving data over the communication network 112 (e.g., to and from the user device 102, the ERP system 108, the $3^{rd}$ party systems 110, and the like). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The provider computing system 104 includes an account database 240 that stores customer profile information and account information relating to one or more accounts associated with the user 101 with the provider institution 103. The account database 240 stores transaction history data of transactions (e.g., payment transactions) made by the user 101 using one or more accounts, for example, with the banking client application 214, the mobile wallet client application 218, and/or other suitable applications. The banking client application 214 and the mobile wallet application 218 permits payments to be sent to the beneficiary 106 via the user device 102. In some arrangements, if the user has configured an ERP system 108 to send trading partner information to the provider computing system 104, the trading partner information may be stored in the account database 240 or any suitable storage device.

In some arrangements, the provider computing system 104 includes a $3^{rd}$ party database 242 that stores $3^{rd}$ party data received from $3^{rd}$ party systems 110. For example, the $3^{rd}$ party data may include public records data (e.g., entity, corporation, or other business data) from a public records service (e.g., secretary of state), news data from a news service, documents and other document-related data from a document service, media (e.g., video, images, audio, social media, etc.) from a media service, authority data from an authority alert service, and/or the like. However, the present disclosure is not limited thereto, and in some arrangements, the $3^{rd}$ party database 242 may be omitted. For example, the provider computing system 104 may have an interface to pull or receive data (e.g., via an API) periodically, as needed, or desired from one or more external databases associated with the $3^{rd}$ party systems 110.

The provider computing system 104 includes a risk analysis circuit 244. The risk analysis circuit 244 is capable of identifying anomalies by analyzing a pattern of behavior of the user to determine if a pending transaction falls within an expected or known behavior. For example, the risk analysis circuit 244 analyzes one or more attributes of the pending transaction with the account/profile information for the user, transaction history, available information for the beneficiary, and/or $3^{rd}$ party data, to determine whether the pending transaction follows an expected behavior or appears to be anomalous. A non-exhaustive list of some of the attributes may include, for example, time and date of the transaction, location where the transaction was initiated, beneficiary information (e.g., name, business, industry, location, and/or the like), monetary amount of the transaction, transaction frequency, purpose of the transaction, and/or the like. However, the present disclosure is not limited thereto, and the risk analysis circuit 244 may analyze any suitable attributes that are available to or learned (e.g., via data mining or machine learning) by the provider computing system 104 as more transaction data is enriched or standardized.

For example, in some arrangements, the risk analysis circuit 244 may analyze transaction history information for the user to determine anomalies. For example, if the transaction history indicates that the user generally initiates transactions on a certain date, time, location, and/or the like, but the pending transaction was initiated outside of these expected norms, then the risk analysis circuit 244 may determine that the pending transaction is anomalous. In some arrangements, the risk analysis circuit 244 may analyze available information for a beneficiary (e.g., name, business, industry, location, and/or the like) of the pending transaction to identify anomalies. For example, if the business or industry of the beneficiary does not correspond to the business or industry of the user, or the location of the beneficiary is outside a threshold geographical area, then the risk analysis circuit 244 may identify that the pending transaction is anomalous. In another example, if the transaction history indicates that a payment for the beneficiary is usually made for a certain amount on a certain date of each month, but one or more of the attributes of the pending transaction indicates otherwise, then the risk analysis circuit may identify that the pending transaction is anomalous. In some arrangements, the risk analysis circuit 244 may analyze the $3^{rd}$ party data to identify anomalies. For example, if the pending transaction includes one or more characteristics of a recent fraud trend, or the $3^{rd}$ party data indicates that the user or the beneficiary has been recently dissolved, then the risk analysis circuit 244 may identify that the pending transaction is anomalous.

In some arrangements, the provider computing system 104 includes a rules database 248 for storing rules (such as but not limited to, threshold limits or values). In some arrangements, the user 101 may set rules via the user device 102 and the risk analysis circuit 244 may use the rules to determine anomalies in the pending transactions. For example, the user may define the circumstances in which the user would like to be alerted of anomalous transactions. In some arrangements, the rules may be predefined or automatically generated by the provider computing system 104. For example, the rules may be automatically generated based on market trends, data mining, and machine learning. In some arrangements, the rules may include exceptions (or whitelists) to one or more of the rules, in which the user defines situations in which a rule may be ignored. For example, while a general rule to notify the user for transactions exceeding a particular monetary amount may be defined, the user may include an exception to the rule for a particular beneficiary.

Upon receiving user-defined or automatically generated rules, the rules are indexed and stored in the rules database 248. A non-exhaustive list of some of the rules may include, for example, dollar amount range, geographical limitations, expected time and date of transactions, industry, purpose for the transactions, frequency of transactions, fraud or market trends, exceptions to the rules (e.g., whitelists) and/or the like. However, the present disclosure is not limited thereto, and the rules may include any suitable user-defined or automatically generated rules based on enriched data available or learned (e.g., via data mining or machine learning) from transactions conducted on the provider computing system 104.

Accordingly, in various arrangements, the risk analysis circuit 244 is communicatively connected to the account database 240, 3rd party database 242, rules database 248, and other databases managed by or connected to the provider computing system 104. For example, the risk analysis circuit 244 is connected to the account database 240 to access (e.g., query) the account/profile information, historical transaction information, and/or trading partner information stored thereon. The risk analysis circuit 244 can also gather the 3rd party data by accessing (e.g., querying) the 3rd party database 242 or other external 3rd party databases. For example, the risk analysis circuit 244 can query the 3rd party databases with suitable APIs. Further, the risk analysis circuit 244 is connected to the rules database 248 to access (e.g., query) the user-defined and/or automatically generated rules.

In some arrangements, the risk analysis circuit 244 is operatively connected to one or more of the components of the provider computing system 104. For example, the risk analysis circuit 244 is connected to the network interface 238 for communicating with one or more of the user device 102, the ERP system 108, and/or the 3rd party systems 110. In some arrangements, the risk analysis circuit 244 may be implemented with the processing circuit 232. For example, the risk analysis circuit 244 can be implemented as a software application stored within the memory 236 and executed by the processor 234. Accordingly, such examples can be implemented with minimal or no additional hardware costs. However, in other arrangements, the risk analysis circuit 244 may be implemented on dedicated hardware specifically configured for performing the operations of the risk analysis circuit 244 described herein.

In some arrangements, the risk analysis circuit 244 includes a risk score generation circuit 246 that generates a risk score for a user based on one or more of the user's responses to the identified anomalies. The risk score may indicate a risk that information associated with the user is false or mischaracterized. For example, a user may be characterized as having a particular type of business or being in a particular industry, but transaction data of the user may indicate that the user appears to be in a different type of business or industry. In this case, if the risk score exceeds a threshold value, then the provider computing system 104 may automatically update (or change) the potentially mischaracterized information. In some arrangements, if the risk score indicates a high risk that information is being intentionally misrepresented to the provider institution (e.g., the user is a bad actor or fraudster), the provider computing system 104 may take additional actions such as, for example, placing a hold on the user's account, flagging the user's account for additional review or triaging, notifying authorities, stopping payments, ignoring the user-defined whitelisting, and/or the like. The risk score can be generated based on suitable models that consider the responses to the identified anomalies by the user 101, and the context information, the account/profile information, the transaction history information, and/or the 3rd party data.

In some arrangements, the risk analysis circuit 244 may determine a risk of a potential insider threat associated with the provider institution by identifying certain rules (e.g., stored in the rules database 248) that run afoul to industry standards for a particular user's business or industry. The term "insider threat" as used in this specification refers to a threat entity (e.g., a rogue employee) within the provider institution that aims to disrupt the provider institution's or user's property or business. For example, the risk analysis circuit 244 may determine that a particular user's account was setup from a computing device of an employee of the provider institution, and that some alleged user-defined rules do not fit a pattern or type of rules (e.g., threshold values) setup by users in the same or similar industries. In this case, the risk analysis circuit 244 may identify the rule as being anomalous, and may send a notification to the user to verify whether the rule was define by the user. If the user verifies that the rule is anomalous (e.g., not defined by the user), then the risk analysis circuit 244 may determine that the employee is potentially an insider threat. Similarly, in some arrangements, the risk analysis circuit 244 may determine that a plurality of user profiles have been created, adjusted, or edited by a computing device of an employee within a short amount of time, which does not conform to normal provider institution activities. In this case, the risk analysis circuit 244 may determine that the employee is potentially an insider threat.

Figure 3:
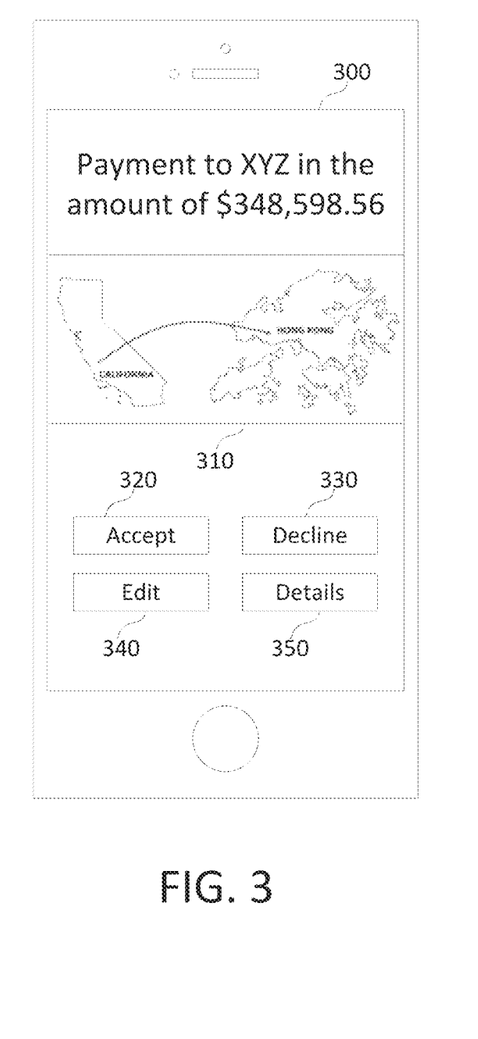
FIG. 3 is a diagram illustrating an interactive display for notifying a user of an anomalous transaction, according to some arrangements.

FIG. 3 is a diagram illustrating an interactive display for notifying a user of an anomalous transaction, according to some arrangements. In some arrangements, when the risk analysis circuit 244 identifies an anomaly in the pending transaction, a notification or alert may be sent to the user device 102 identifying the anomalous transaction. The notification may cause the user device 102 to visually display or otherwise indicate the details of the pending transaction that was identified as being anomalous. For example, in some arrangements, the user device 102 may display the details of the pending transaction via an interactive dashboard 300 on the banking client application 214, the mobile wallet client application 218, a web application, or any suitable application. The dashboard 300 may provide information about the pending transaction, reasons (e.g., a map, graphical interface, list of risk factors, and/or the like) for why the pending transaction was identified as being anomalous, and instructions for resolving the anomalies.

For example, referring to FIG. 3, in some arrangements, the dashboard 300 may identify the pending transaction, the beneficiary of the pending transaction, and the monetary amount of the pending transaction. In some arrangements, the dashboard 300 may display a map 310 or other graphical interface to allow the user to verify a geographical location where the transaction was initiated, a geographical location or address of the beneficiary, an industry of the user and/or the beneficiary, and/or the like. In some arrangements, the user may interact with the dashboard 300 to accept 320 the pending transaction, decline 330 the pending transaction, edit 340 the pending transaction, and/or obtain further details 350 of the pending transaction. In some arrangements, if the user selects to edit 340 the pending transaction, the user may adjust a monetary amount and/or edit the beneficiary information for the pending transaction. In some arrangements, if the user selects to decline 330 the pending transaction, the pending transaction may be canceled or quarantined.

In some arrangements, if the user selects to accept 320 the pending transaction, the dashboard 300 may indicate one or more rules that are violated by the pending transaction. In this case, the dashboard may provide instructions for resolving the one or more rules. For example, the dashboard may provide instructions for setting up a one-time exception to the one or more rules, setting up a blanket exception (e.g., whitelist) to the one or more rules, editing or deleting the one or more rules, and/or skipping the setup process to proceed with the payment. In some arrangements, if the user elects to skip the setup process while still proceeding with the payment, the default may be to automatically setup a one-time exception to the one or more rules. Further, in some arrangements, the dashboard 300 may provide guidance for recovering funds if the processed transaction is later determined to be the result of fraudulent activity.

In some arrangements, if the user selects to obtain further details 350 of the pending transaction, the dashboard 300 may provide additional information corresponding to the anomalous attributes associated with the pending transaction. For example, the dashboard 300 may visually display or otherwise indicate historical behavior patterns for the user so that the user can compare the anomalous attributes of the pending transaction with attributes from historical transactions. In some arrangements, the dashboard 300 may visually display or otherwise indicate industry standards for the business or industry of the user and/or beneficiary corresponding to the attributes of the pending transaction. In some arrangements, the dashboard 300 may visually display or otherwise indicate fraud trends associated with one or more attributes of the pending transaction. Accordingly, by providing additional details 350 corresponding to the pending transaction, the user may assess the risks involved when deciding to accept or decline the pending transaction.

Figure 4:
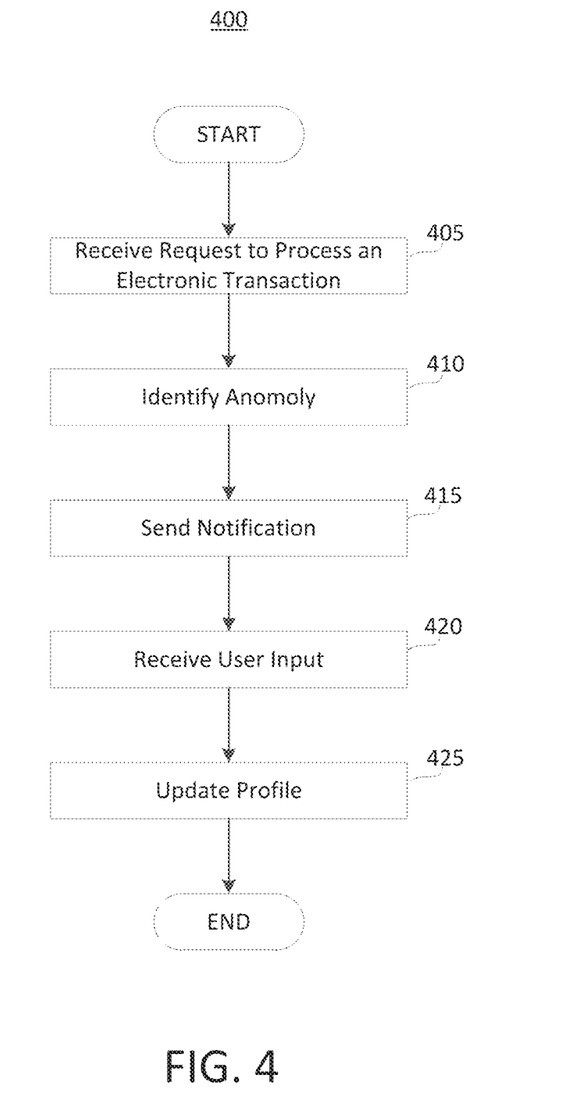
FIG. 4 is a flow diagram of a process or method for detecting anomalies in an electronic transaction, according to some arrangements.

FIG. 4 is a flow diagram of a process or method for detecting anomalies in an electronic transaction, according to some arrangements. Referring to FIG. 3, the process starts and a request to process an electronic transaction is received from a user device at block 405. The electronic transaction may correspond to a payment or transfer of funds from a user of the user device to a beneficiary. When processing of the electronic transaction, an anomaly is detected at block 410. In some arrangements, the anomaly may be detected if the electronic transaction is not consistent with a profile or a pattern of behavior of the user. For example, in some arrangements, user account/profile information, trading partner data, and/or transactional history data are analyzed to detect the anomaly. In some arrangements, an anomaly is detected if one or more attributes of the electronic transaction fail to satisfy one or more user-defined or automatically generated rules (e.g., threshold values). In some arrangements, the beneficiary's information is analyzed to detect the anomaly. In some arrangements, $3^{rd}$ party data is analyzed to detect the anomaly.

In response to detecting the anomaly, a notification is sent to the user device at block 415 to cause the user device to visually display or otherwise indicate that an anomaly was detected for the electronic transaction. For example, in some arrangements, the user device may display the details of the pending transaction via an interactive dashboard on a banking client application, a mobile wallet client application, a web application, or any suitable application. The dashboard provides detailed information about the electronic transaction and one or more reasons for detecting the anomaly associated with the electronic transaction, so that the user can determine the risk of proceeding with the electronic transaction.

A response is received from the user via the interactive dashboard at block 420. In some arrangements, the response includes an indication that the risks associated with the identified anomaly are acceptable. For example, the user may indicate via the interactive dashboard a desire to proceed with the payment, albeit the risks associated with the identified anomaly. In response to the indication that the identified anomaly is acceptable, one or more attributes in the profile information corresponding to the user may be modified or updated at block 425. For example, in some arrangements, a business or industry type of the user may be updated or modified. In some arrangements, a risk score indicating a risk that one or more attributes in the profile of the user may need to be modified or re-categorized may be updated.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc.

Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims, and their equivalents.

What is claimed is:
1. A computing system comprising:
one or more processors; and
one or more computer-readable storage media communicatively coupled to the one or more processors and having instructions stored thereon that, when executed by the one or more processors, cause the one or more processors to:
receive, from a provider computing system, a request from a user device to process an electronic transaction;
identify an anomaly associated with the electronic transaction, wherein the anomaly is identified based on a profile or pattern of the user;
transmit data corresponding to the anomaly to an interactive dashboard displayed on the user device, the interactive dashboard comprising a graphical interface comprising a geographical location or address of where the electronic transaction was initiated and a list of risk factors, wherein the interactive dashboard further comprises information about the electronic transaction, a geographical map, one or more reasons why the anomaly was identified, or instructions for resolving the anomaly;
receive a first response from the interactive dashboard displayed on the user device indicating that one or more risks associated with the list of risk factors are acceptable, wherein the first response further comprises a verification of the geographical location or address;
in response to receiving the first response, transmit an indication of one or more rule violations and instructions for resolving the one or more rule violations to the interactive dashboard displayed on the user device, wherein the graphical interface comprises an interface to add, modify, or delete the one or more rules for the electronic transaction;
receive a second response from the interactive dashboard displayed on the user device setting an exception to the one or more rule violations; and
update the profile of a user associated with the user device, wherein updating comprises changing a classification of the user from a first classification to a second classification and changing a risk score regarding one or more attributes of the profile based on the first response and the second response, wherein the risk score is unique to the profile, and wherein the first classification corresponds to profile data that was originally provided by the user, and wherein the second classification corresponds to different profile data consistent with the electronic transaction.

2. The system of claim 1, wherein the electronic transaction corresponds to a payment from the user of the user device to a beneficiary, wherein one or more processors receive the request via a near field communication at the provider computing system associated with the beneficiary.

3. The system of claim 2, wherein the identifying of the anomaly further comprises:
analyze the profile data corresponding to the user;
determine that the electronic transaction is inconsistent with transactional history data.

4. The system of claim 3, wherein the identifying of the anomaly further comprises:
analyze third-party data corresponding to the beneficiary; and
determine that the electronic transaction is inconsistent with the third-party data.

5. The system of claim 4, wherein the third-party data corresponding to the beneficiary is received from an enterprise resource planning (ERP) system, and wherein the third-party data comprises trading partner information identifying a location of the beneficiary.

6. The system of claim 4, wherein the third-party data corresponding to the beneficiary indicates that the beneficiary is in a different industry from that of the user as indicated by the profile data corresponding to the user.

7. The system of claim 6, wherein the updating of the profile of the user comprises updating an industry of the user based on the different industry of the beneficiary.

8. The system of claim 1, further comprising:
automatically generate the one or more rules based on at least a market trend, data mining, or machine learning.

9. A method comprising:
receiving, by a processing circuit from a provider computing system, a request from a user device to process an electronic transaction;
identifying, by the processing circuit, an anomaly associated with the electronic transaction, wherein the anomaly is identified based on a profile or pattern of the user;
transmitting, by the processing circuit, data corresponding to the anomaly to an interactive dashboard displayed on the user device, the interactive dashboard comprising a graphical interface comprising a geographical location or address of where the electronic transaction was initiated and a list of risk factors, wherein the interactive dashboard further comprises information about the electronic transaction, a geographical map, one or more reasons why the anomaly was identified, or instructions for resolving the anomaly;
receiving, by the processing circuit, a first response from the interactive dashboard displayed on the user device indicating that one or more risks associated with the list of risk factors are acceptable, wherein the first response further comprises a verification of the geographical location or address;
in response to receiving the first response, transmitting, by the processing circuit, an indication of one or more rule violations and instructions for resolving the one or more rule violations to the interactive dashboard displayed on the user device, wherein the graphical interface comprises an interface to add, modify, or delete the one or more rules for the electronic transaction;
receiving, by the processing circuit, a second response from the interactive dashboard displayed on the user device setting an exception to the one or more rule violations; and
updating, by the processing circuit, the profile of a user associated with the user device, wherein updating comprises changing a classification of the user from a first classification to a second classification and changing a risk score regarding one or more attributes of the profile based on the first response and the second response, wherein the risk score is unique to the profile, and wherein the first classification corresponds to profile data that was originally provided by the user, and wherein the second classification corresponds to different profile data consistent with the electronic transaction.

10. The method of claim 9, wherein the electronic transaction corresponds to a payment from the user of the user device to a beneficiary, wherein one or more processors receive the request via a near field communication at the provider computing system associated with the beneficiary.

11. The method of claim 10, wherein the identifying of the anomaly further comprises:
analyzing, by the processing circuit, the profile data corresponding to the user;
determining, by the processing circuit, that the electronic transaction is inconsistent with transactional history data;
analyzing, by the processing circuit, third-party data corresponding to the beneficiary; and
determining, by the processing circuit, that the electronic transaction is inconsistent with the third-party data.

12. The method of claim 11, wherein the third-party data corresponding to the beneficiary is received from an enterprise resource planning (ERP) system, and wherein the third-party data comprises trading partner information identifying a location of the beneficiary.

13. The method of claim 11, wherein the third-party data corresponding to the beneficiary indicates that the beneficiary is in a different industry from that of the user as indicated by the profile data corresponding to the user.

14. The method of claim 13, wherein the updating of the profile of the user comprises updating an industry of the user based on the different industry of the beneficiary.

15. The method of claim 9, further comprising:
automatically generating, by the processing circuit, the one or more rules based on at least a market trend, data mining, or machine learning.

16. A non-transitory computer-readable medium having processor-readable instructions stored thereon such that, when executed by a processor, cause the processor to:
receive, from a provider computing system, a request from a user device to process an electronic transaction;
identify an anomaly associated with the electronic transaction, wherein the anomaly is identified based on a profile or pattern of the user;
transmit data corresponding to the anomaly to an interactive dashboard displayed on the user device, the interactive dashboard comprising a graphical interface comprising a geographical location or address of where the electronic transaction was initiated and a list of risk factors, wherein the interactive dashboard further comprises information about the electronic transaction, a geographical map, one or more reasons why the anomaly was identified, or instructions for resolving the anomaly;

receive a first response from the interactive dashboard displayed on the user device indicating that one or more risks associated with the list of risk factors are acceptable, wherein the first response further comprises a verification of the geographical location or address;

in response to receiving the first response, transmit an indication of one or more rule violations and instructions for resolving the one or more rule violations to the interactive dashboard displayed on the user device, wherein the graphical interface comprises an interface to add, modify, or delete the one or more rules for the electronic transaction;

receive a second response from the interactive dashboard displayed on the user device setting an exception to the one or more rule violations; and update the profile of a user associated with the user device, wherein updating comprises changing a classification of the user from a first classification to a second classification and changing a risk score regarding one or more attributes of the profile based on the first response and the second response, wherein the risk score is unique to the profile, and wherein the first classification corresponds to profile data that was originally provided by the user, and wherein the second classification corresponds to different profile data consistent with the electronic transaction.

* * * * *